United States Patent
Wulliman et al.

(10) Patent No.: US 6,627,561 B1
(45) Date of Patent: Sep. 30, 2003

(54) BURN THROUGH AND FLAME PROPAGATION RESISTANT LAYER OR COVERING

(75) Inventors: Rebecca S. Wulliman, Englewood, CO (US); Ralph Michael Fay, Lakewood, CO (US)

(73) Assignee: Johns Manville International, Inc., Denver, CO (US)

( * ) Notice: Subject to any disclaimer, the term of this patent is extended or adjusted under 35 U.S.C. 154(b) by 261 days.

(21) Appl. No.: 09/595,483

(22) Filed: Jun. 16, 2000

(51) Int. Cl.[7] .......................... B32B 27/12; B32B 27/32; B32B 15/04
(52) U.S. Cl. ............................ 442/1; 442/394; 442/397; 442/344; 442/414; 442/417; 442/82; 442/85; 442/86; 442/169; 428/347; 428/421; 428/920; 428/27; 428/40; 428/138
(58) Field of Search ...................... 442/394, 397, 442/344, 414, 417, 82, 85, 86, 169; 428/347, 421, 920, 1, 27, 40, 138, 86

(56) References Cited

U.S. PATENT DOCUMENTS

| | | | | |
|---|---|---|---|---|
| 4,499,134 A | * | 2/1985 | Whitely et al. | 428/102 |
| 4,726,987 A | * | 2/1988 | Trask et al. | 428/282 |
| 5,447,975 A | * | 9/1995 | Uschold | 523/435 |
| 6,312,561 B1 | * | 11/2001 | Forsten et al. | 162/145 |

* cited by examiner

*Primary Examiner*—Terrel Morris
*Assistant Examiner*—Alexis Wachtel
(74) *Attorney, Agent, or Firm*—Robert D. Touslee

(57) ABSTRACT

A burn through and flame propagation resistant system, includes a sheet of burn through and flame propagation resistant paper made of aramid fibers, mica flakes, and aramid fibrid binder; and one or more sheets of polymeric film, preferably, flame propagation resistant polymeric film, bonded to at least one major surface of the sheet of burn through and flame propagation resistant paper to form a laminated sheet. Preferably, for many applications, the system is also water vapor transmission resistant with the sheet or sheets of polymeric film or a coating providing the water vapor transmission resistance. The burn through and flame propagation resistant paper and/or polymeric film(s) may have major surface(s) coated with a heat sealable adhesive, e.g. for securing the laminated sheet to itself or another laminated sheet to form a bag or envelope for encapsulating insulation. The laminated sheet may be used as a covering or bag that encapsulates insulation material or as a layer overlaying, intermediate or underlaying one or more layers of insulation material. As an alternative to the laminated sheet, the system may include a sheet of burn through and flame propagation resistant paper which is treated with a heat and/or ultrasonically sealable, moisture and flame propagation resistant polyvinylfluoride water based emulsion.

4 Claims, 2 Drawing Sheets

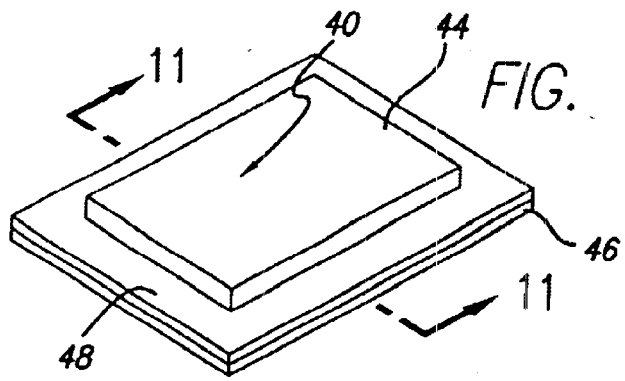
FIG. 10
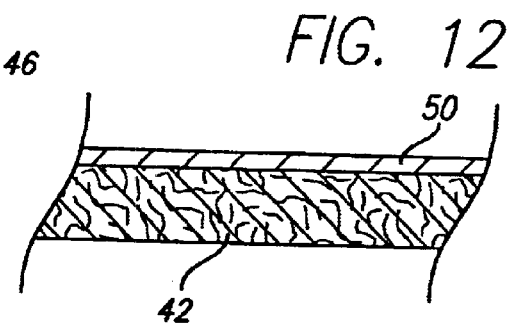
FIG. 12
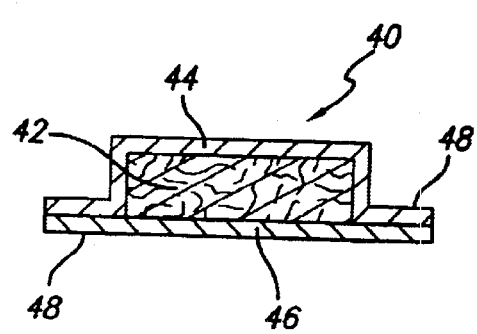
FIG. 11
FIG. 13
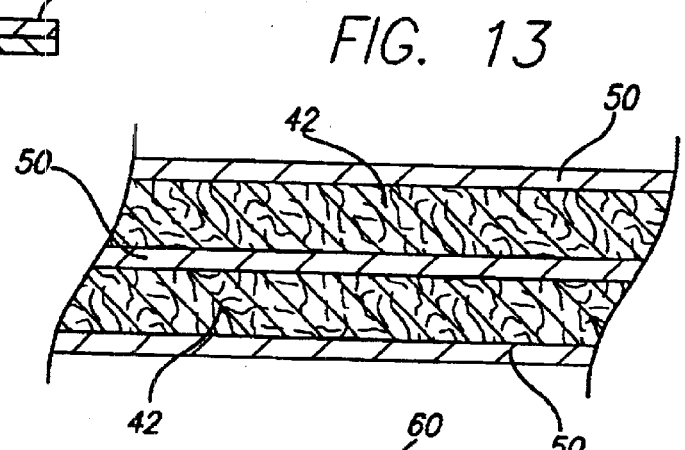
FIG. 14
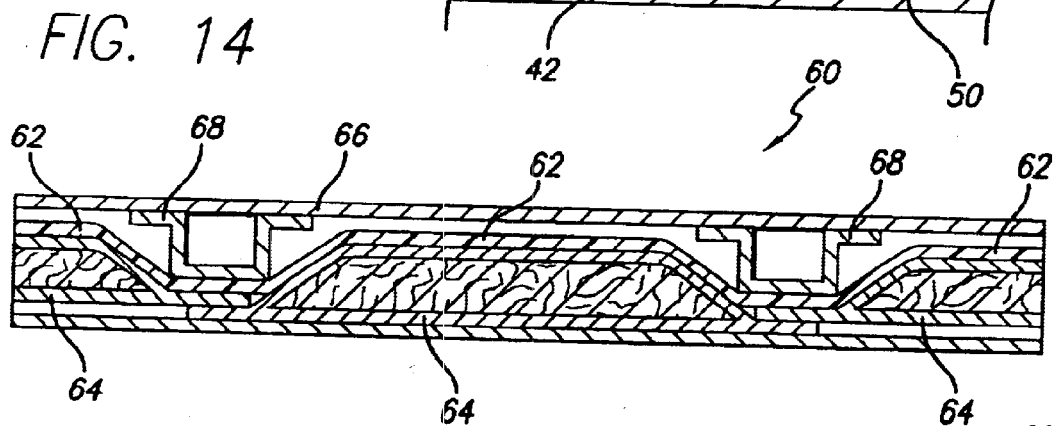
FIG. 15
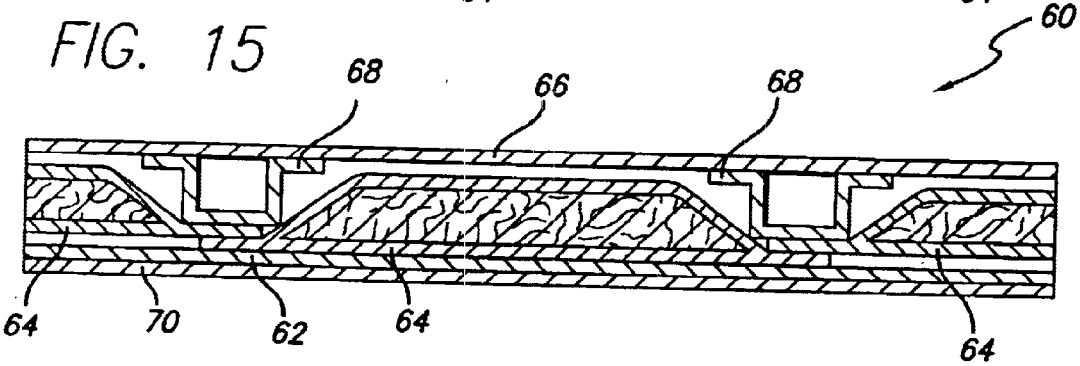

BURN THROUGH AND FLAME PROPAGATION RESISTANT LAYER OR COVERING

BACKGROUND OF THE INVENTION

This invention relates to a burn through and flame propagation resistant layer or covering for use in thermal and acoustical insulation systems, such as, but not limited to, those used in commercial aircraft. Preferably, for many applications such as commercial aircraft, the burn through and flame propagation resistant layer is also water vapor transmission resistant. The invention can be used as a layer or covering, e.g. interleaved between, laid over, or laid behind layers of thermal and acoustical insulation material or as a covering or bag for partially or totally encapsulating one or more layers of thermal and acoustical insulation material. While the burn through and flame propagation resistant layer or covering of the present invention is particularly well suited for aircraft applications, especially when the layer or covering is also water vapor transmission resistant, the burn through and flame propagation layer or covering may also be used for other applications where layers or coverings having these properties are needed or desirable.

The Notice of Proposed Rule-making expected to be issued by the Federal Aviation Administration (FAA) in the near future will require thermal and acoustical insulation blanket systems in commercial aircraft to provide improved burn through protection and flame propagation resistance. These systems typically include thermal and acoustical insulation blankets encapsulated within a film covering or bag. As the thermal and acoustical insulation systems are currently constructed, the burn through regulations primarily affect the contents of the insulation systems bags and the flame propagation resistance regulations primarily affect the film coverings used to fabricate the bags. Previous development work by a number of manufacturers has addressed the burn through resistance of the insulation within the bags or the flame propagation resistance of the film coverings used to fabricate the bags housing the insulation. However, no current system has solved both problems in the same product while providing the properties and low costs necessary for widespread commercial acceptance. Some of the systems currently being proposed are outlined in the following paragraphs.

With regard to burn through resistance one proposed system would utilize one or more layers of a nonwoven mat, made of fibers commercially available from The 3M Company of St. Paul, Minn. under the trade designation "NEXTEL" as a fire barrier in the insulation blanket. The mat weighs 65 g/m$^2$ and costs $15.00/m$^2$ or more. Flame propagation issues still have to be addressed in connection with the film covering material.

With regard to flame propagation resistance, one proposed system would use a reinforced metallized polyvinylfluoride film covering manufactured by Facile Holdings, Inc. of Paterson, N.J., under the trade designations "INSULFAB 330®" or "INSULFAB 331®". The reinforced metallized polyvinylfluoride film provides flame propagation resistance to the system but weighs 44 g/m$^2$ and costs about $9.00/m$^2$ compared to the reinforced polyester film covering currently used to fabricate the bag which weighs 25 g/m$^2$ and costs about $2.70/m$^2$.

Another proposal for flame propagation resistance is a system which would use reinforced polyimide film covering material manufactured by Orcon Corporation under the trade designation "KN-80®". The reinforced polyimide film covering material provides flame propagation resistance to the system but weighs 50 g/m$^2$ and costs about $13.00/m$^2$ compared to the reinforced polyester film covering currently used to fabricate the bag which weighs 25 g/m$^2$ and costs about $2.70/m$^2$. Alone, this reinforced polyimide film covering does not provide significant burn through resistance.

SUMMARY OF THE INVENTION

The preferred burn through and flame propagation resistant layer or covering of the present invention, which is also water vapor transmission resistant, provides a solution, in a single light weight product, to both the burn through and the flame propagation requirements for light weight, thermal and acoustical insulation systems (such as those to be used in commercial aircraft) while also providing the water vapor transmission resistance required by such insulation systems. Furthermore, the burn through, flame propagation and water vapor transmission resistant layer or covering of the present invention can be easily incorporated into such insulation systems without the need to redesign the individual components of the system, e.g. by making the bag that contains or houses the insulation of the system from the covering of the present invention. Typically, the individual thermal and acoustical insulation components used to insulate aircraft fuselages are specifically designed at considerable cost to very close tolerances (e.g. length, width, thickness, and configuration) to precisely fit each specific portion of the fuselage. Thus, the ability to incorporate the burn through, flame propagation and, preferably, water vapor transmission resistant layer or covering of the present invention into such insulation systems without the need to redesign the individual components of the system is a valuable characteristic of the present invention.

One preferred embodiment of the burn through, flame propagation and water vapor transmission resistant system of the present invention includes a layer or covering which includes a sheet of burn through and flame propagation resistant paper made of aramid fibers, mica flakes, and aramid fibrid binder; and a sheet of water vapor transmission and flame propagation resistant polymeric film which has a major surface bonded to one major surface of the sheet of burn through and flame propagation resistant paper to form a laminated sheet. The laminated sheet may include a second sheet of polymeric film bonded to the other major surface of the burn through and flame propagation resistant paper.

The laminated sheet may also have a scrim layer incorporated into or bonded to the sheet or one of the sheets of the polymeric film and/or the sheet of burn through and flame propagation resistant paper to add strength to the laminated sheet, especially puncture and tear resistance. Furthermore, the sheet of polymeric film or, when two sheets of polymeric film are used, one of the sheets or both sheets of polymeric film in the laminated sheet may have a second major surface coated with a heat or ultrasonically sealable adhesive (hereinafter "a heat sealable adhesive") for securing the laminated sheet: to itself or to another laminated sheet to form a covering, envelope, or bag for containing or encapsulating an insulation material; to an insulation layer; or to a structure, such as the skin, framework and/or the trim panels of an aircraft fuselage.

When the burn through and flame propagation resistant laminated sheet is also water vapor transmission resistant and the laminated sheet is formed into a covering, such as a bag or envelope, that partially or totally encloses or encapsulates one or more layers of thermal and acoustical insulation material, such as lightweight, flexible, glass fiber blankets or sheets of polyimide foam, the covering, envelope or bag formed from the laminated sheet serves to inhibit water vapor transmission during normal service and to inhibit both burn through and flame propagation in the event of fire. When the burn through and flame propagation resistant laminated sheet is also water vapor transmission resistant, the laminated sheet may also be used between layers or as a covering for one or more layers of lightweight, flexible, thermal and acoustical insulation material in an insulation system to inhibit water vapor transmission during normal service and to inhibit both burn through and flame propagation in the event of fire. For example, the laminated sheet may be used in a "wallpaper" application as a covering or layer that is located intermediate insulation material in fuselage wall cavities and the outer skin of an aircraft fuselage (as an outboard layer of an insulation system) or intermediate insulation material in fuselage wall cavities and the interior aircraft trim panels (as an inboard layer of an insulation system).

As an alternative to the laminated sheet described above, the burn through, flame propagation and, preferably, water vapor transmission resistant layer or covering of the present invention may be a sheet of burn through and flame propagation resistant paper made of aramid fibers, mica flakes, and aramid fibrid binder which is treated with a heat and/or ultrasonic sealable, moisture and flame propagation resistant polyvinylfluoride water based emulsion. As with the burn through, flame propagation and, preferably, water vapor transmission resistant laminated sheet described above, the treated sheet of burn through and flame propagation resistant paper can be used as a covering to contain thermal and acoustical insulation material (e.g. formed into a bag or envelope), can be used as a layer located intermediate layers of insulation material, or as a covering over one or more layers of such insulation material. The treated sheet of burn through and flame propagation resistant paper can have a scrim sheet or layer bonded to a major surface of the paper, preferably, by the heat sealable, moisture and flame propagation resistant polyvinylfluoride water based emulsion, to add strength, especially puncture and tear resistance.

The burn through, flame propagation and water vapor transmission resistant layer or covering of the present invention when used in a thermal and acoustic insulation blanket system for commercial aircraft passes the FAA medium scale burn through test; passes the flame propagation test; and preferably, has a water vapor permeability in perms of 4.0 or less and more preferably, of 2.5 or less. Preferably, the burn through, flame propagation and water vapor transmission resistant layer or covering of the present invention meets the material specifications of The Boeing Company of Seattle, Wash. for burst strength and puncture resistance having a minimum burst strength of 23 pounds per square inch (23 lb/in$^2$) (Class 1 Film BMS 8-142) and has a minimum puncture resistance of 2 pounds. In simulated aircraft fuselage tests, aircraft thermal and acoustic insulation systems, using bags or envelopes for containing the insulation blankets made from the burn through, flame propagation and water vapor transmission resistant layers or coverings of the present invention, demonstrate heat and sound transmissions which are equivalent to current systems.

The burn through test referred to herein is the new Federal Aviation Administration (FAA) medium scale burn through test as presently defined (May 22, 2000) by the www.fire.tc-.faa.gov web site (herein referred to as "the FAA medium scale burn through test"). The FAA medium scale burn through test subjects the hot or outboard side major surface of a test sample to the flame of an oil burner that generates a temperature of approximately 1100° C. The discharge end of the oil burner nozzle is positioned 10 centimeters (10 cm) from and directed toward the hot side major surface of the sample and generates a pulsating flame front. The FM medium scale burn through test measures the cold or inboard side heat flux at two specific locations on the cold side of the sample. To pass the FAA medium scale burn through test the sample must prevent both visible burn through and a cold side heat flux exceeding 2.0 Btu/ft$^2$ for four minutes.

The flame propagation test referred to herein uses heat from a radiant panel and a pilot flame and is performed similarly to the current ASTM E 648 test procedures and performance criteria. Like the FM medium scale burn through test, the flame propagation test (hereinafter referred to as "the flame propagation test") is defined on the www-.fire.tc.faa.gov web site. In the flame propagation test a pilot flame is applied at a zero point, for a period of fifteen seconds, to a horizontally oriented sample sheet. To pass the test, the flame must not propagate more than two inches beyond the point of contact (the zero point) between the pilot flame and the sample sheet and the sample sheet must not support continued combustion after the pilot flame is removed (there can be on evident flaming after the pilot flame is removed.

BRIEF DESCRIPTION OF THE DRAWINGS

FIG. 10 is a schematic perspective view of the burn through, flame propagation and, preferably, water vapor transmission resistant layer or covering of the present invention used as a bag or envelope to enclose, encapsulate or contain a thermal and acoustical insulation material.

FIG. 11 is a cross section of FIG. 10, taken substantially along lines 11—11 of FIG. 10.

FIG. 12 is a partial schematic cross section through an insulation system where the burn through, flame propagation and, preferably, water vapor transmission resistant layer or covering of the present invention overlays a layer of insulation material.

FIG. 13 is a partial schematic cross section through an insulation system where burn through, flame propagation and, preferably, water vapor transmission resistant layers or coverings of the present invention overlay, are interleaved between and are overlaid by layers of insulation material.

FIG. 14 is a partial schematic horizontal cross section through an aircraft fuselage with the burn through, flame propagation, and, preferably, water vapor transmission resistant layer or covering forming the outboard layer of a thermal and acoustical insulation system.

FIG. 15 is a partial schematic horizontal cross section through an aircraft fuselage with the burn through, flame propagation, and, preferably, water vapor transmission resistant layer or covering forming the inboard layer of a thermal and acoustical insulation system.

DESCRIPTION OF THE PREFERRED EMBODIMENTS

Figure 5:
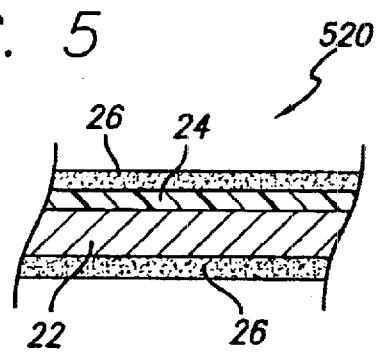
Figure 6:
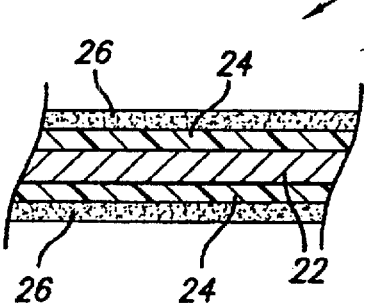
Figure 7:
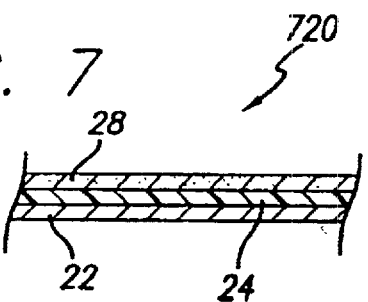

The laminates 120, 220, 320, 420, 520, 620 and 720 of the burn through, flame propagation and, preferably, water vapor transmission resistant layer or covering of the present invention, schematically illustrated in FIGS. 1–7, include a sheet of burn through and flame propagation resistant paper 22 (burn through barrier paper 22) and a sheet of polymeric film 24, which is preferably, flame propagation and water vapor transmission resistant, bonded to one or both major surfaces of the burn through barrier paper 22. FIG. 7 shows a laminate 720 which includes a separate scrim layer. The laminates 120–620 may also include a separate scrim layer or a polymeric film 24 reinforced with scrim for added strength, especially added puncture and tear resistance.

The sheet of burn through barrier paper 22 includes aromatic polyamide (aramid) fibers, mica flakes and aromatic polyamide (aramid) fibrid binder. Preferably, the barrier paper 22 contains between 30% and 50% by weight mica flakes and, typically, between 25% and 35% by weight aramid fibers and between 25% and 35% aramid fibrid binder. The barrier paper is made by a wet laid paper making process which combines the aramid fibers, the mica flakes and the aramid fibrid binder. The barrier paper, thus produced, can be calendared to align the mica flakes, reduce the paper thickness and provide improved burn through protection. While lighter weight barrier papers may be possible, the barrier paper 22 typically weighs about 89 grams per square meter (89 g/m$^2$). An example of such a burn through barrier paper is a paper made and sold by E.I. DuPont de Nemours & Co. of Wilmington, Del. under the trade designation NOMEX® M Type 418 paper.

To provide additional water repellency to the barrier paper 22, the barrier paper 22 may be treated by dipping, spray or roll coating the barrier paper 22 with a fluorocarbon or similar water repellant, such as but not limited to a perfluorooctanyl. An example of such a water repellant is sold by The 3M Company of St. Paul, Minn. under the trade designation "SCOTCHGUARD®".

The barrier paper 22 is adhesively bonded or heat sealed to one or two sheets of polymeric film 24 which preferably are water vapor transmission and flame propagation resistant. Polyester films are an example of films that are water vapor transmission resistant but not flame propagation resistant. Polyvinylfluoride films and polyimide films are examples of polymeric films 24 which are both water vapor transmission and flame propagation resistant. These flame propagation resistant films resist flame propagation and, preferably, when one of these films, extending horizontally, is exposed to a pilot flame, the flame propagates no more than 2 inches beyond the point of flame contact in fifteen seconds. When an open flame is removed from contact with such films, these films do not support continued combustion and cease to burn (no continued flaming is evident). Commercially available examples of these films are films sold by E.I. DuPont de Nemours & Co. of Wilmington, Del., such as, a polyester film sold under the trade designation MYLAR®; a polyvinylfluoride film sold under the trade designation TEDLAR®; and a polyimide film sold under the trade designation KAPTON®. The film or films 24 are typically from 0.2 to 1.0 mils thick and typically weigh between 20 and 50 g/m$^2$. The light weight of the films 24 is due in part to the elimination of a reinforcing scrim from the film. With the film or films 24 adhesively bonded or heat sealed to the burn through barrier paper 22, the burn through barrier paper 22 reinforces the film or films 24 and a scrim may no longer needed in the film or films for certain applications. Preferably, the film 24 has a permeability in perms of 4.0 or less and more preferably, a permeability of 2.5 perms or less. The polyvinylfluoride and the polyimide film can be metallized, e.g. by condensing an aluminum vapor on the film, to reduce the permeability of the film.

Preferably, the burn through barrier paper 22 and the polymeric film or films 24 are bonded together by a layer or layers of heat and/or ultrasonically sealable adhesive, e.g. a polyester based adhesive, with fire retardant additives, located intermediate the major surfaces of the barrier paper 22 and film(s) 24. Examples of such heat and/or ultrasonically sealable adhesives are adhesives sold by Bostik Incorporated, of Middleton, Mass., under the trade designations BOSTIK THERMOGRIP® 1101, 1165 and 1175.

Figure 1:
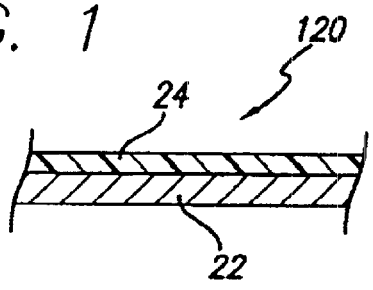
FIGS. 1–9 are schematic cross sections through different embodiments of the burn through, flame propagation and, preferably, water vapor transmission resistant layer or covering of the present invention.

The burn through, flame propagation, and, preferably, water vapor transmission resistant laminated sheet 120, shown in FIG. 1, includes a sheet of burn through barrier paper 22 and a sheet of polymeric film 24 with a major surface of the film bonded, e.g. by a heat sealable adhesive, to a major surface of the burn through barrier paper 22. While the bonding of the polymeric film 24 to the burn through barrier paper 22 may enhance the abrasion resistance and the durability of the burn through barrier paper 22, preferably, the polymeric film 24 is a flame propagation and water vapor transmission resistant film. When the polymeric film 24 is flame propagation resistant, the film 24 can be on the side of the laminated sheet 120 expected to face the flame front of a fire. When the polymeric film 24 is water vapor transmission resistant, the film 24 restricts the transmission of water vapor through the laminated sheet 120. When the polymeric film 24 is flame propagation and water vapor transmission resistant and the laminated sheet 120 is formed into a bag or envelope containing insulation, such as but not limited to the bag or envelope of FIGS. 10 and 11, the polymeric film 24 resists the transmission of water vapor into the burn through barrier paper 22 of the laminated sheet 120 and through the laminated sheet 120 into any insulation contained or encapsulated within bags or envelopes formed from the laminated sheet 120. By restricting the accumulation of water in the burn through barrier paper 22, the integrity of the burn through barrier paper 22 and the laminated sheet 120 is better preserved and by restricting the accumulation of water in the insulation encapsulated within bags or envelopes formed from the laminated sheet 120 the thermal and acoustical properties of an insulation system including the encapsulated insulation are better preserved and a build up of weight within the insulation system which would adversely affect the performance of an aircraft is avoided.

Where the polymeric film 24 of the laminated sheet 120 is a polyvinylfluoride or a polyimide film, the laminated sheet 120 can be oriented with the film 24 of the laminated sheet on the cold or inboard side of the laminated sheet (the side of the laminated sheet expected to face away from any fire) and the burn through barrier paper 22 on the hot or outboard side of the laminated sheet (the side of the laminated sheet expected to face toward any fire) or with the burn through barrier paper 22 on the cold side of the laminated sheet and the polymeric film 24 on the hot side of the laminated sheet. Preferably, where the polymeric film 24 of the laminate sheet 120 is a polyester film, the laminated sheet 120 is oriented with the polymeric film 24 on the cold side of the laminated sheet and the burn through barrier paper 22 on the hot side of the laminated sheet so that the burn through barrier paper 22 provides the flame propagation resistance. Likewise, where a polymeric film 24 of any of the other laminated sheets 220 to 620, is a polyvinylfluoride or a polyimide film, that laminated sheet may be oriented with the polymeric film 24 on the side of the laminated sheet expected to face any fire and where the polymeric film 24 of any of the other laminated sheets 220–620 is a polyester film, that laminated sheet should, preferably, be oriented with the polymeric film 24 on the side of the laminated sheet expected to face away from any fire.

Figure 2:
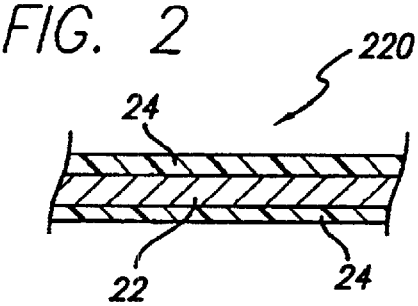

The burn through, flame propagation, and, preferably, water vapor transmission resistant laminated sheet 220, shown in FIG. 2, includes a sheet of burn through barrier paper 22 and two sheets of polymeric film 24 with major surfaces of the polymeric films 24 bonded, e.g. by a heat sealable adhesive, to the two major surfaces of the burn through barrier paper 22. While the bonding of the polymeric films 24 to the burn through barrier paper 22 may enhance the abrasion resistance and the durability of the burn through barrier paper 22, preferably, at least one of the polymeric films 24 is a flame propagation and water vapor transmission resistant film. When one of the polymeric films 24 is flame propagation resistant, that polymeric film 24 can be on the side of the laminated sheet 220 expected to face the flame front of a fire. When one of the polymeric films 24 is water vapor transmission resistant, the polymeric film 24 restricts the transmission of water vapor through the laminated sheet 220. When one of the polymeric films 24 is flame propagation and water vapor transmission resistant and the laminated sheet 220 is formed into a bag or envelope containing insulation, such as but not limited to the bag or envelope of FIGS. 10 and 11, with the outside surface of the bag or envelope formed from the flame propagation and water vapor transmission resistant polymeric film 24, that polymeric film 24 resists the transmission of water vapor into the burn through barrier paper 22 of the laminated sheet 220 and through the laminated sheet 220 into any insulation contained or encapsulated within bags or envelopes formed from the laminated sheet 220. By restricting the accumulation of water in the burn through barrier paper 22, the integrity of the burn through barrier paper 22 and the laminated sheet 220 is better preserved and by restricting the accumulation of water in the insulation encapsulated within bags or envelopes formed from the laminated sheet 220 the thermal and acoustical properties of an insulation system including the encapsulated insulation are better preserved and a build up of weight within the insulation system which would adversely affect the performance of an aircraft is avoided.

Figure 3:
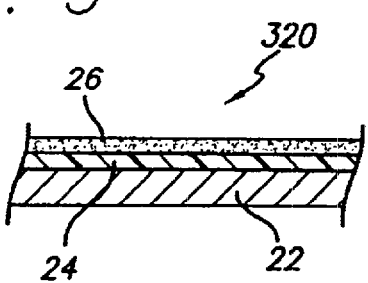

The burn through, flame propagation, and, preferably, water vapor transmission resistant laminated sheet 320, shown in FIG. 3, includes a sheet of burn through barrier paper 22, a sheet polymeric film 24 with a major surface of the film bonded, e.g. by a heat sealable adhesive, to a major surface of the burn through barrier paper 22, and a heat sealable adhesive coating 26 on and coextensive with the polymeric film 24. The heat sealable adhesive coating 26 enables the burn through, flame propagation and, preferably, water vapor transmission resistant laminated sheet 320 to be bonded: to itself or another laminated sheet 320 when formed into a bag or envelope to contain or encapsulate insulation; to insulation material to which the laminate 320 is applied; or to a structural component, e.g. the framework, skin or trim panels of an aircraft fuselage. Examples of heat sealable adhesive coatings that may be used are polyester based adhesives with fire retardant additives and polyvinylfluoride based adhesives. The heat sealable adhesive coating 26 typically weighs between 20 and 100 g/m$^2$.

While the bonding of the polymeric film 24 to the burn through barrier paper 22 in the laminated sheet 320 may enhance the abrasion resistance and the durability of the burn through barrier paper 22, preferably, the polymeric film 24 is a flame propagation and water vapor transmission resistant film. When the polymeric film 24 is flame propagation resistant, the polymeric film 24 can be on the side of the laminated sheet 320 expected to face the flame front of a fire. When the polymeric film 24 is water vapor transmission resistant, the polymeric film 24 restricts the transmission of water vapor through the laminated sheet 320. When the polymeric film 24 is flame propagation and water vapor transmission resistant and the laminated sheet 320 is formed into a bag or envelope containing insulation, such as but not limited to the bag or envelope of FIGS. 11 and 12, the polymeric film 24 resists the transmission of water vapor into the burn through barrier paper 22 of the laminated sheet 320 and through the laminated sheet 320 into any insulation contained or encapsulated within bags or envelopes formed from the laminated sheet 320. By restricting the accumulation of water in the burn through barrier paper 22, the integrity of the burn through barrier paper 22 and the laminated sheet 320 is better preserved and by restricting the accumulation of water in the insulation encapsulated within bags or envelopes formed from the laminated sheets 320 the thermal and acoustical properties of an insulation system including the encapsulated insulation are better preserved and a build up of weight within the insulation system which would adversely affect the performance of an aircraft is avoided.

Figure 4:
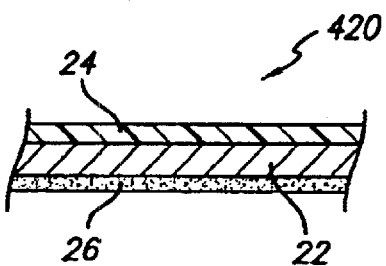

The burn through, flame propagation, and, preferably, water vapor transmission resistant laminated sheet 420, shown in FIG. 4, includes a sheet of burn through barrier paper 22, a sheet of polymeric film 24 with a major surface of the film bonded, e.g. by a heat sealable adhesive, to a first major surface of the burn through barrier paper 22, and a heat sealable adhesive coating 26 applied to and coextensive with a second major surface of the burn through barrier paper 22. The heat sealable adhesive coating 26 enables the burn through, flame propagation and water vapor transmission resistant laminated sheet 420: to be bonded to itself or another laminated sheet 420 when formed into a bag or envelope for containing or encapsulating insulation; to insulation material to which the laminated sheet 420 is applied; or to a structural component, e.g. the framework, skin or trim panels of an aircraft fuselage. Examples of heat sealable adhesive coatings that may be used are polyester based adhesives with fire retardant additives and polyvinylfluoride based adhesives. The heat sealable adhesive coating 26 typically weighs between 20 and 100 g/m$^2$ (dry weight).

While the bonding of the polymeric film 24 to the burn through barrier paper 22 in the laminated sheet 420 may enhance the abrasion resistance and the durability of the burn through barrier paper 22, preferably, the polymeric film 24 is a flame propagation and water vapor transmission resistant film. When the polymeric film 24 is flame propagation resistant, the polymeric film 24 can be on the side of the laminated sheet 420 expected to face the flame front of a fire. When the polymeric film 24 is water vapor transmission resistant, the polymeric film restricts water vapor transmission through the laminated sheet 420. When the polymeric film 24 is flame propagation and water vapor transmission resistant and the laminated sheet 420 is formed into a bag or envelope containing insulation, such as but not limited to the bag or envelope of FIGS. 10 and 11, the polymeric film 24 resists the transmission of water vapor into the burn through barrier paper 22 of the laminated sheet 420 and through the laminated sheet 420 into any insulation contained or encapsulated within bags formed from the laminated sheet 420. By restricting the accumulation of water in the burn through barrier paper 22, the integrity of the burn through barrier paper 22 and the laminated sheet 420 is better preserved and by restricting the accumulation of water in the insulation encapsulated within bags or envelopes formed from the laminated sheet 420 the thermal and acoustical properties of an insulation system including the encapsulated insulation are better preserved and a build up of weight within the insulation system which would adversely affect the performance of an aircraft is avoided.

The burn through, flame propagation, and, preferably, water vapor transmission resistant laminated sheet 520, shown in FIG. 5, includes a sheet of burn through barrier paper 22, a sheet of polymeric film 24 with a major surface of the film bonded, e.g by a heat sealable adhesive, to a first major surface of the burn through barrier paper 22, a heat sealable adhesive coating 26 applied to and coextensive with a second major surface of the burn through barrier paper 22, and a heat sealable adhesive coating 26 applied to and coextensive with a second major surface of the sheet of polymeric film 24. The heat sealable adhesive coatings 26 enable the burn through, flame propagation and water vapor transmission resistant laminated sheet 520 to be bonded: to itself or another laminated sheet when formed into a bag or envelope for containing or encapsulating insulation; to insulation material to which the laminate 520 is applied; or to a structural component, e.g. the framework, skin or trim panels of an aircraft fuselage. Examples of heat sealable adhesive coatings that may be used are polyester based adhesives with fire retardant additives and polyvinylfluoride based adhesives. The heat sealable adhesive coatings 26 typically weigh between 20 and 100 g/m² (dry weight).

While the bonding of the polymeric film 24 to the burn through barrier paper 22 in the laminated sheet 520 may enhance the abrasion resistance and the durability of the burn through barrier paper 22, preferably, the polymeric film 24 is a flame propagation and water vapor transmission resistant film. When the polymeric film 24 is flame propagation resistant, the polymeric film 24 can be on the side of the laminated sheet 520 expected to face the flame front of a fire. When the polymeric film 24 is water vapor transmission resistant, the film 24 restricts the transmission of water vapor through the laminated sheet 520. When the polymeric film 24 is flame propagation and water vapor transmission resistant and the laminated sheet 520 is formed into a bag or envelope containing insulation, such as but not limited to the bag or envelope of FIGS. 10 and 11, the polymeric film 24 resists the transmission of water vapor into the burn through barrier paper 22 of the laminated sheet 520 and through the laminated sheet 520 into any insulation contained or encapsulated within bags or envelopes formed from the laminated sheet 520. By restricting the accumulation of water in the burn through barrier paper 22, the integrity of the burn through barrier paper 22 and the laminated sheet 520 is better preserved and by restricting the accumulation of water in the insulation encapsulated within bags or envelopes formed from the laminated sheet 520 the thermal and acoustical properties of an insulation system including the encapsulated insulation are better preserved and a build up of weight within the insulation system which would adversely affect the performance of an aircraft is avoided.

The burn through, flame propagation, and, preferably, water vapor transmission resistant laminated sheet 620, shown in FIG. 6, includes a sheet of burn through barrier paper 22, two sheets of polymeric film 24 with major surfaces of the films bonded, e.g. by a heat sealable adhesive, to the two major surfaces of the burn through barrier paper 22, and heat sealable adhesive coatings 26 overlaying and coextensive each sheet of the polymeric film 24. The heat sealable adhesive coatings 26 enable the burn through, flame propagation and water vapor transmission resistant laminated sheet 620: to be bonded to itself or another laminated sheet 620 when formed into a bag or envelope for containing or encapsulating insulation; to insulation material to which the laminated sheet 620 is applied; or to a structural component, e.g. the framework, skin or trim panels of an aircraft fuselage. Examples of heat sealable adhesive coatings that may be used are polyester based adhesives with fire retardant additives and polyvinylfluoride based adhesives. While the heat sealable adhesive coatings are shown applied to both sheets 24 of the polymeric film, the heat sealable adhesive may be applied to only one of the sheets of polymeric film 24. The heat sealable coatings 26 typically weigh between 20 and 100 g/m² (dry weight).

While the bonding of the polymeric films 24 to the burn through barrier paper 22 in the laminated 620 may enhance the abrasion resistance and the durability of the burn through barrier paper 22, preferably, at least one of the polymeric films 24 is a flame propagation and water vapor transmission resistant film. When one of the polymeric films 24 is flame propagation resistant, that polymeric film 24 can be on the side of the laminated sheet 620 expected to face the flame front of a fire. When one of the polymeric films 24 is water vapor transmission resistant, that polymeric film 24 restricts the transmission of water vapor through the laminated sheet 620. When one of the polymeric films 24 is flame propagation and water vapor transmission resistant and the laminated sheet 620 is formed into a bag or envelope containing insulation, such as but not limited to the bag or envelope of FIGS. 10 and 11, with the outside surface of the bag formed from the flame propagation and water vapor transmission resistant polymeric film 24, that polymeric film 24 resists the transmission of water vapor into the burn through barrier paper 22 of the laminated sheet 620 and through the laminated sheet 620 into any insulation contained or encapsulated within bags or envelopes formed from the laminated sheet 620. By restricting the accumulation of water in the burn through barrier paper 22, the integrity of the burn through barrier paper 22 and the laminated sheet 620 is better preserved and by restricting the accumulation of water in the insulation encapsulated within bags or envelopes formed from the laminated sheet 620 the thermal and acoustical properties of an insulation system including the encapsulated insulation are better preserved and a build up of weight within the insulation system which would adversely affect the performance of an aircraft is avoided.

The burn through, flame propagation, and preferably, water vapor transmission resistant laminated sheet 720, shown in FIG. 7, includes a sheet of burn through barrier paper 22, a sheet of polymeric film 24 with a first major surface of the film bonded to a major surface of the burn through barrier paper 22, and a sheet of scrim 28 bonded to a second major surface of the polymeric film 24 e.g. by a heat sealable adhesive. Other than the scrim 28 bonded to the sheet of polymeric film 24 to increase the puncture and tear resistance to the laminated sheet, the laminated sheet 720 is the same as laminated sheet 120. While not shown, the laminated sheets 220, 320, 420, 520 and 620 may also have a sheet or layer of scrim 28 overlaying and adhesively bonded to the burn through barrier paper 22, intermediate and bonded to both the burn through barrier paper 22 and the sheet or one of the sheets of polymeric film 24, or overlaying and bonded to the sheet or one of the sheets of polymeric film 24. Other than the inclusion of the scrim 28 to increase the puncture and tear resistance of the laminated sheets, the laminated sheets 220–620 would otherwise be the same. Commercially available Nylon, NOMEX, polyester, glass scrims and other similar scrims may be used as the scrims for laminated sheets 120 to 720. Instead of incorporating the reinforcing scrims in the laminated sheets 120–620 as separate layers, the reinforcing scrims may also be incorporated into the laminated sheets 120-620 by using scrim reinforced polymeric films 24.

Figure 8:
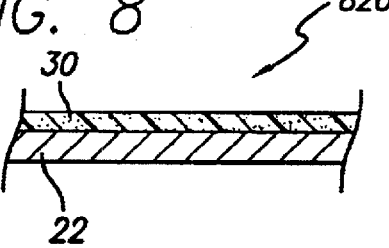
Figure 9:
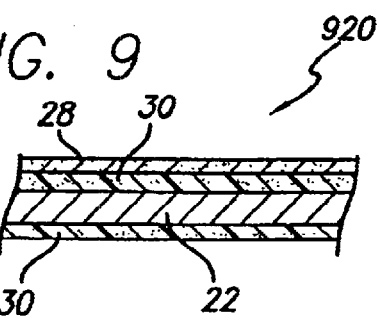

The burn through, flame propagation and water vapor transmission resistant sheets, layers or coverings 820 and 920 of the present invention, schematically illustrated in FIGS. 8 and 9, include a sheet of the burn through barrier paper 22 which is treated with a heat and/or ultrasonically sealable, water vapor and flame propagation resistant polyvinylfluoride water based emulsion (heat sealable adhesive). Preferably, the burn through, flame propagation and water vapor transmission resistant sheets 820 and 920 have a permeability of 4.0 perms or less and, more preferably, a permeability of 2.5 perms or less. In addition, a sheet or layer of scrim 28 is bonded to one major surface of the burn through barrier paper 22 in the sheet 920 of FIG. 9, preferably, with the heat sealable emulsion, to increase the puncture and tear resistance of the sheet 920. While not shown, the sheet 820 of FIG. 8 could also include a layer or sheet of scrim bonded to one major surface of the burn through barrier paper 22. Commercially available Nylon, NOMEX, polyester and glass scrims may be used as the scrims for sheets 820 to 920. The sheet of burn through barrier paper 22 may be dip, spray or roll coated on one or both major surfaces, as shown in FIGS. 8 and 9, respectively, with the heat sealable, water vapor and flame propagation resistant polyvinylfluoride water based emulsion. Preferably, the heat sealable, water vapor transmission and flame propagation resistant polyvinylfluoride water based emulsion coating(s) 30 weigh between 20 and 100 g/m$^2$ (dry weight). Coating the burn through barrier paper 22 with the heat sealable, water vapor and flame propagation resistant polyvinylfluoride water based emulsion has several benefits. The polyvinylfluoride water based emulsion can enhance the durability and flexibility of the burn through barrier paper 22. The polyvinylfluoride water based emulsion can provide the water vapor transmission resistance required of the sheets when used to form the insulation bags or envelopes for most aircraft without the use of the sheet(s) of polymeric film 24. Since the polyvinylfluoride water based emulsion is heat sealable, the polyvinylfluoride water based emulsion coating(s) can be used: to bond the burn through, flame propagation and water vapor transmission resistant sheets 820 and 920 to themselves or another sheet 820 or 920 to form a bag or envelope to contain or encapsulate insulation material; to insulation material to which the sheets 820 and 920 are applied; or to a structural component, e.g. the framework, skin or trim panels of an aircraft fuselage. The polyvinylfluoride water based emulsion also has excellent fire resistance and low toxic gas evolution during combustion. An example of a heat sealable, water vapor and flame propagation resistant polyvinylfluoride water based emulsion is a polyvinylfluoride water based emulsion sold by Elf Atochem North America, Inc. of King of Prussia, Pa. under the trade designation KYNAR®.

When the burn through, flame propagation and water vapor transmission resistant sheet 820 is formed into a bag or envelope containing insulation, such as but not limited to the bag or envelope of FIGS. 10 and 11, with the coated surface forming the outer surface of the bag or envelope or when the burn through, flame propagation and water vapor transmission resistant sheet 920 is formed into a bag or envelope, such as but not limited to the bag or envelope of FIGS. 10 and 11, the heat and/or ultrasonically sealable, water vapor and flame propagation resistant polyvinylfluoride water based emulsion coating 30 restricts the transmission of water vapor into the burn through barrier paper 22 of the sheet 820 or 920 and through the sheet 820 or 920 into any insulation contained or encapsulated within bags or envelopes formed from the sheets 820 or 920. By restricting the accumulation of water in the burn through barrier paper 22, the integrity of the burn through barrier paper 22 and the sheet 820 or 920 is better preserved and by restricting the accumulation of water in the insulation encapsulated within bags or envelopes formed from the sheet 820 or 920 the thermal and acoustical properties of an insulation system including the encapsulated insulation are better preserved and a build up of weight within the insulation system which would adversely affect the performance of an aircraft is avoided.

In addition to other applications where burn through and flame propagation resistance or where burn through, flame propagation and water vapor transmission resistance is desired or required, the burn through, flame propagation and water vapor transmission resistant layers or coverings 120 to 920 may be used to form a bag or envelope 40 that encloses, contains or encapsulates a layer of thermal and acoustical insulation material 42, such as one or more light weight, flexible glass fiber insulation blankets or one or more sheets of polyimide foam, as shown in FIGS. 10 and 11. The bag or envelope 40 shown in FIGS. 10 and 11 includes two sheets 44 and 46 of one of the layers or coverings 120 to 920 which are heat sealed or otherwise bonded together at the tab 48 to form the bag or envelope 40. While, as shown, two sheets 44 and 46 of the layers or coverings 120 to 920 are used to form the bag or envelope 40 containing the insulation 42, the bag or envelope 40 could be made from one sheet of layers or coverings 120 to 920. As shown in FIGS. 12 and 13, for certain applications, one or more sheets 50 of layers or coverings 120 to 920 may also overlay, be overlaid by or be located intermediate major surfaces of layer(s) of thermal and acoustical insulation 42, such as light weight, flexible, glass fiber or polyimide foam insulation material. While not shown, the sheets 50 may also overlay the side and end edges of the insulation layer(s) as well as the major surface(s) of the insulation layer(s).

Examples of light weight, flexible, glass fiber and foam insulation materials which may be included in thermal and acoustical insulation systems utilizing the burn through, flame propagation and, preferably, water vapor transmission resistant layers or coverings 120 to 920 as covering to totally or partially encapsulate or contain the insulation materials or as layers overlaying, overlaid by or intermediate layer(s) of thermal and acoustical insulation are light weight, flexible glass fiber insulation materials sold by Johns Manville International, Inc. under the trade designations MICROLITE AA® (a 1.5 pcf, 0.6 pcf or 0.42 pcf insulation) and MICROLITE AA® Premium NR fiber glass (a 1.2 pcf, 0.5 pcf or 0.34 pcf insulation) and polyimide foam sold by In-Spec-Foam of Plano, Tex., under the trade designation INSULMIDE®.

FIGS. 14 and 15 schematically show insulation systems for an aircraft fuselage 60 wherein the insulation is located in a cavity of the fuselage intermediate the outer skin 66 and framework 68 of the fuselage 60 and the trim panels 70 of the aircraft cabin. As shown in FIG. 14, a sheet 62 of the one of the layers or coverings 120 to 920 is located intermediate bags 64 of insulation in the cavities of the aircraft fuselage and the outer skin 66 and framework 68 of the fuselage (on the outboard side of the bags of insulation) to provide a burn through, flame propagation, and preferably, water vapor transmission resistant barrier. As shown in FIG. 15, a sheet 62 of the one of the layers or coverings 120 to 920 is located intermediate bags 64 of insulation in the cavities of the aircraft fuselage and the trim panels 70 of the aircraft cabin (on the inboard side of the bags of insulation) to provide a burn through, flame propagation, and preferably, water vapor transmission resistant barrier. The sheets 62 of FIGS. 14 and 15 are secured to the aircraft fuselage by pins, clamps or other conventional fastening means used in the aircraft industry.

Thermal and acoustical insulation systems were tested utilizing burn through, flame propagation and water vapor transmission resistant laminate coverings of the present invention. The laminates (System Samples 1–8) each included a sheet of mica filled NOMEX®M type 418 paper with a sheet of film bonded to the paper by a heat sealable adhesive coating. The laminates were used as coverings for both the inboard or cold side and the outboard or hot side of the systems. Two layers of lightweight (0.42 pounds/ft$^3$), flexible glass fiber insulation (glass fiber insulation sold by Johns Manville International, Inc. of Denver, Colo., under the trade designation MICROLITE AA® insulation) were contained between the laminate coverings.

The System samples were subjected to the FAA medium scale burn through test and the flame propagation test. The FAA medium scale burn through test is passed when there are 240 or more seconds to failure and the heat flux at both locations on the cold side specified in the test (Flux 1 and 2) at 240 seconds is less than 2.0 Btu/ft$^2$/second. Seven of the eight system samples passed the FAA medium scale burn through test and all of the system samples passed the flame propagation test.

SYSTEM SAMPLES TESTED

| MATERIAL DESCRIPTION | LAMINATE WEIGHT g/m$^2$ | SYSTEM WEIGHT g/m$^2$ |
| --- | --- | --- |
| System Sample 1<br>0.5 mil metallized pvf/<br>5 mil NOMEX ®M paper/<br>Heat Seal Coating | 180 | 702 |
| System Sample 2<br>0.5 mil metallized pvf/<br>5 mil NOMEX ®M paper/<br>Polyester/Scrim/Heat Seal Coating | 208 | 758 |
| System Sample 3<br>0.75 mil Polyimide film/<br>5 mil NOMEX ®M paper/<br>Polyester/Scrim/Heat Seal Coating | 163 | 668 |
| System Sample 4<br>0.5 mil metallized pvf/<br>3 mil NOMEX ®M paper/<br>Polyester/Scrim/Heat Seal Coating | 157 | 656 |
| System Sample 5<br>0.5 mil metallized pvf/<br>3 mil NOMEX ®M paper/<br>Heat Seal Coating | 124 | 590 |
| System Sample 6<br>0.75 mil Polyimide film/<br>3 mil NOMEX ®M paper/<br>Polyester/Scrim/Heat Seal Coating | 161 | 664 |
| System Sample 7<br>0.75 mil Polyimide film/<br>3 mil NOMEX ®M paper/<br>Heat Seal Coating | 134 | 610 |
| System Sample 8<br>0.75 mil Polyimide film/<br>5 mil NOMEX ®M paper/<br>Heat Seal Coating | 194 | 730 | pvf = polyvinylfluoride film
Heat Seal Coating = heat sealable polyester based adhesive

BURN THROUGH TEST

| MATERIAL DESCRIPTION | BURN THROUGH SECONDS | FLUX 1 | FLUX 2 |
| --- | --- | --- | --- |
| System Sample 1<br>0.5 mil metallized pvf/<br>5 mil NOMEX ®M paper/<br>Heat Seal Coating | >360<br>@240 | 0.75<br>0.4 | 1.22<br>0.7 |
| System Sample 2<br>0.5 mil metallized pvf/<br>5 mil NOMEX ®M paper/<br>Polyester/Scrim/Heat Seal Coating | >360<br>@240 | 0.69<br>0.5 | 0.59<br>0.4 |
| System Sample 3<br>0.75 mil Polyimide film/<br>5 mil NOMEX ®M paper/<br>Polyester/Scrim/Heat Seal Coating | 330<br>@240 | 1.56<br>0.9 | 1.4<br>1.3 |
| System Sample 4<br>0.5 mil metallized pvf/<br>3mil NOMEX ®M paper/<br>Polyester/Scrim/Heat Seal Coating | 150 | 1.9 | 0.7 |
| System Sample 5<br>0.5 mil metallized pvf/<br>3 mil NOMEX ®M paper/<br>Heat Seal Coating | 285<br>@240 | 1.4<br>1.1 | 1.25<br>0.8 |
| System Sample 6<br>0.75 mil Polyimide film/<br>3 mil NOMEX ®M paper/<br>Polyester/Scrim/Heat Seal Coating | >360<br>@240 | 1.7<br>1.4 | 1.1<br>0.6 |
| System Sample 7<br>0.75 mil Polyimide film/<br>3 mil NOMEX ®M paper/<br>Heat Seal Coating | 255<br>@240 | 2.3<br>1.7 | 1.3<br>1.2 |
| System Sample 8<br>0.75 mil Polyimide film/<br>5 mil NOMEX ®M paper/<br>Heat Seal Coating | >360<br>@240 | 1.02<br>0.4 | 0.61<br>0.4 |

Flux = Btu/ft$^2$/second

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto water based emulsion.

What is claimed is:

1. A burn through, flame propagation and water vapor transmission resistant sheet, comprising:

a sheet of burn through and flame propagation resistant paper having first and second major surfaces and comprising: aramid fibers, mica flakes, and aramid fibrid binder, the sheet of burn through and flame propagation resistant paper having the first major surface treated with a heat sealable, moisture and flame propagation resistant polyvinylfluoride water based emulsion coating and having a water vapor permeability of 4.0 perms or less; and a sheet of reinforcing scrim bonded by the heat sealable polyvinylfluoride coating to the first major surface of the sheet of burn through and flame propagation resistant paper to increase the puncture and tear resistance of the burn through, flame propagation and water vapor transmission resistant sheet.

2. The burn through, flame propagation and water vapor transmission resistant sheet according to claim 1, wherein:

the sheet of burn through and flame propagation resistant paper has from about 30% to about 50% by weight mica.

3. The burn through, flame propagation and water vapor transmission resistant sheet according to claim 1, wherein:

the polyvinylfluoride coating, by dry weight, is between 20 and 100 g/m$^2$.

4. The burn through, flame propagation and water vapor transmission resistant sheet according to claim 1, wherein:

the sheet of burn through and flame propagation resistant paper having a second major surface treated with a heat sealable, moisture and flame propagation resistant polyvinylfluoride water based emulsion coating.

* * * * *